US007866346B1

(12) United States Patent
Walters

(10) Patent No.: US 7,866,346 B1
(45) Date of Patent: Jan. 11, 2011

(54) MUD PUMP RECEIVING FLANGE AND PLUG RETAINER

(76) Inventor: Jimmy A. Walters, P.O. Box 371, Olla, LA (US) 71465

( * ) Notice: Subject to any disclaimer, the term of this patent is extended or adjusted under 35 U.S.C. 154(b) by 252 days.

(21) Appl. No.: 12/348,666

(22) Filed: Jan. 5, 2009

Related U.S. Application Data

(60) Provisional application No. 61/019,484, filed on Jan. 7, 2008.

(51) Int. Cl.
*F16L 55/10* (2006.01)
(52) U.S. Cl. ........................... 138/89; 138/96 T
(58) Field of Classification Search .............. 138/89, 138/96 R
See application file for complete search history.

(56) References Cited

U.S. PATENT DOCUMENTS

| | | | | |
|---|---|---|---|---|
| 4,285,572 A * | 8/1981 | Beaudette et al. | ............. | 385/88 |
| 4,436,117 A * | 3/1984 | Martin | ......................... | 138/89 |
| 4,770,206 A | 9/1988 | Sjoberg | ................. | 137/516.29 |
| 5,306,124 A | 4/1994 | Back | ........................... | 417/406 |
| 5,458,257 A * | 10/1995 | Muckelrath et al. | ......... | 220/562 |
| 5,480,163 A | 1/1996 | Miser et al. | .................. | 277/437 |
| 5,509,476 A * | 4/1996 | Vick, Jr. | .................... | 166/75.13 |
| 5,616,009 A | 4/1997 | Birdwell | ...................... | 417/342 |
| 5,701,935 A * | 12/1997 | Vasudeva | ...................... | 138/89 |
| 6,050,613 A * | 4/2000 | Wartluft | ...................... | 285/328 |
| 6,116,285 A * | 9/2000 | Wilson | ........................... | 138/89 |
| 6,588,318 B2 | 7/2003 | Aday et al. | ................. | 92/171.1 |
| 7,234,388 B2 | 6/2007 | Orr et al. | .................... | 92/171.1 |
| 7,438,519 B2 | 10/2008 | Torres-Reyes | ............... | 415/126 |
| 2008/0012241 A1* | 1/2008 | Norman et al. | ............... | 277/616 |
| 2009/0084456 A1* | 4/2009 | Mantyla | ....................... | 138/90 |

* cited by examiner

*Primary Examiner*—Patrick F Brinson

(57) ABSTRACT

A plug retainer and receiving flange for a mud pump fluid module pipe comprising a plug retainer and a receiving flange. The threads of the plug retainer are configured into at least two segments that are axially disposed opposite each other upon the periphery of the plug retainer. Each segment of plug retainer threads has at least two columns of threads that are progressively stepped outward from said the periphery of said plug retainer. The receiving flange has at least two segments of flange threads axially disposed upon the periphery of the flange bore that are disposed opposite each other on the flange bore to form gaps between each of the thread segments, each segment of receiving flange threads has at least two columns of threads that are progressively stepped inward and are configured to correspond with the plug retainer thread segments. A means to rotate the plug retainer within the bore of the receiving flange is provided to engage the plug retainer threads with the receiving flange threads. The plug retainer threads and the receiving flange threads may be horizontally disposed and a lock plate may be provided to avoid inadvertent turning of the plug retainer in the receiving flange.

19 Claims, 7 Drawing Sheets

MUD PUMP RECEIVING FLANGE AND PLUG RETAINER

This application claims priority to U.S. Provisional Application Ser. No. 61/019,484 filed Jan. 7, 2008 by Jimmy A. Walters, the entire contents of which is hereby incorporated by reference.

FIELD OF INVENTION

The invention herein disclosed relates to components for high pressure fluid pumps such as those typically used to pump drilling fluid ("mud") that is used in the drilling of wells and in particular relates to a receiving flange and plug retainer for components for high pressure drilling mud pumps for deep wells common to the oil and gas industry.

BACKGROUND OF INVENTION

Drilling fluids are pumped into a well by mud pumps through a series of mud lines and valves. Typically, these pumps introduce the drilling fluids into a pipe under high pressure and with a high velocity. The drilling fluids used in wells are often corrosive and abrasive in nature. Use of such fluids under such conditions and with such physical properties typically requires the frequent maintenance of inlet and outlet valves by which such fluid is controlled and maintained. Because maintenance of these valves is a frequent necessity, the valve are typically equipped with a removable "plug retainer". Removal of the plug retainer permits access to the seal plug, valve, and other components of the fluid modular chamber.

It is common practice for a plug retainer to be screwed in place into a threaded receiving flange. Often it is difficult and time consuming to unscrew and screw the plug retainer from the receiving flange, when the plug retainer is removed and replaced for maintenance on the valve section of the pump is necessary. The invention herein disclosed is directed to providing a plug retainer which is faster, easier and safer to remove and replace.

SUMMARY OF INVENTION

The present invention presents a plug retainer and receiving flange that has a unique arrangement of coupling threads that will provide a rapid engagement and disengagement of the plug retainer from the receiving flange in order to provide ready access to the valve systems. The arrangement of the coupling threads on the plug retainer and the receiving flange into a plurality of corresponding blank segments and threaded segments allows for the engagement and disengagement of the plug retainer from the receiving flange with only a partial turn of the plug retainer on the receiving flange.

It is that that the unique arrangement of engagement threading on the plug retainer and the receiving flange will require only one-sixth rotation of the plug retainer on the receiving flange, without force, to provide sufficient sealing of the plug retainer with the receiving flange even under the high pressure and flow rates typically seen with drilling fluids. Further, the one-sixth required rotation will provide ease of disengagement of the plug retainer from the receiving flange when access to valve components is necessary.

DESCRIPTION OF EMBODIMENTS

Figure 1:
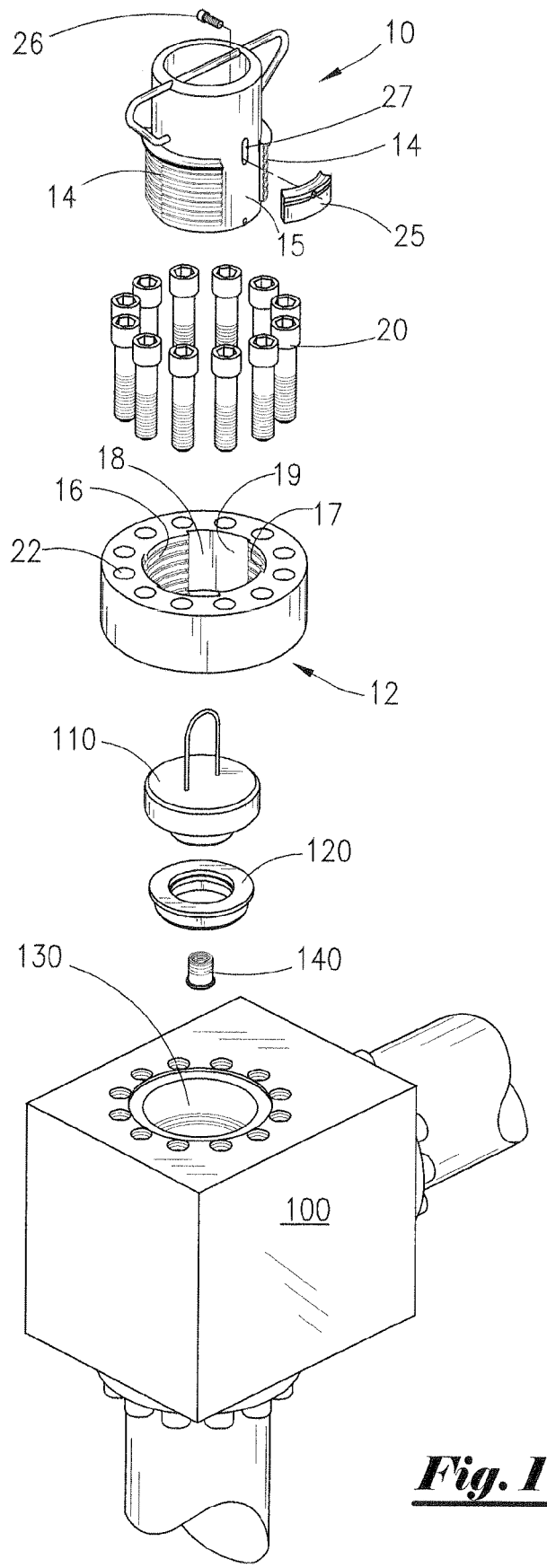
FIG. 1 is an exploded view of an assembly of a mud pump receiving flange, plug retainer, seal plug and plug seal having the thread segment arrangement of the present invention.
Figure 2:
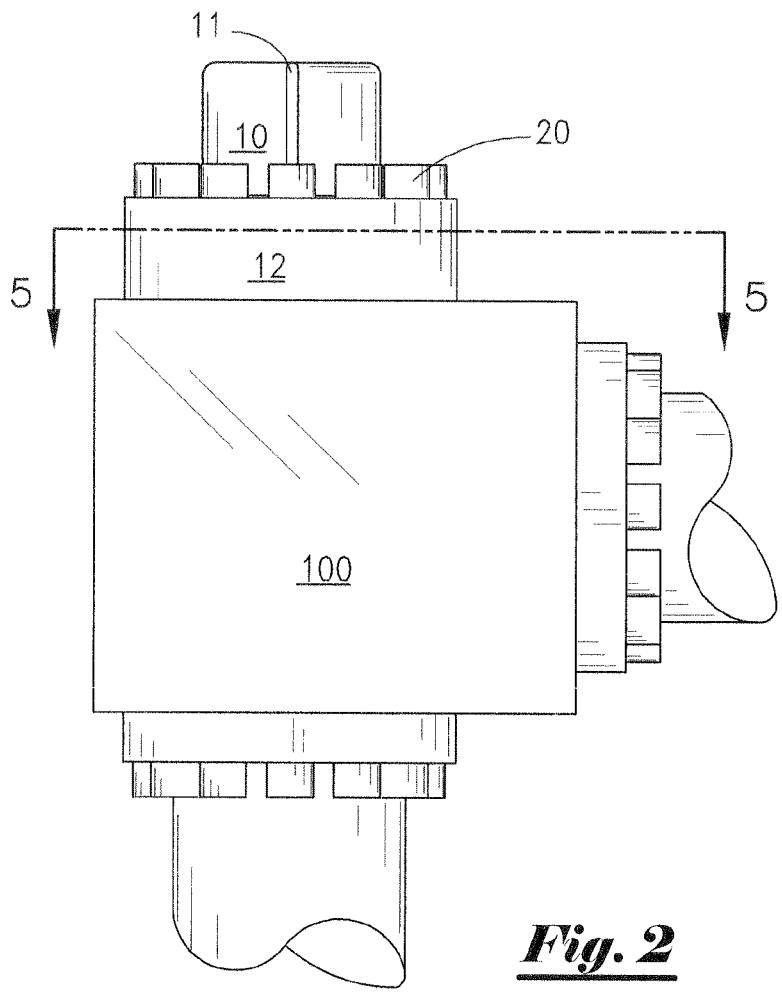
FIG. 2 is a side view of the assembly of FIG. 1.
Figure 3:
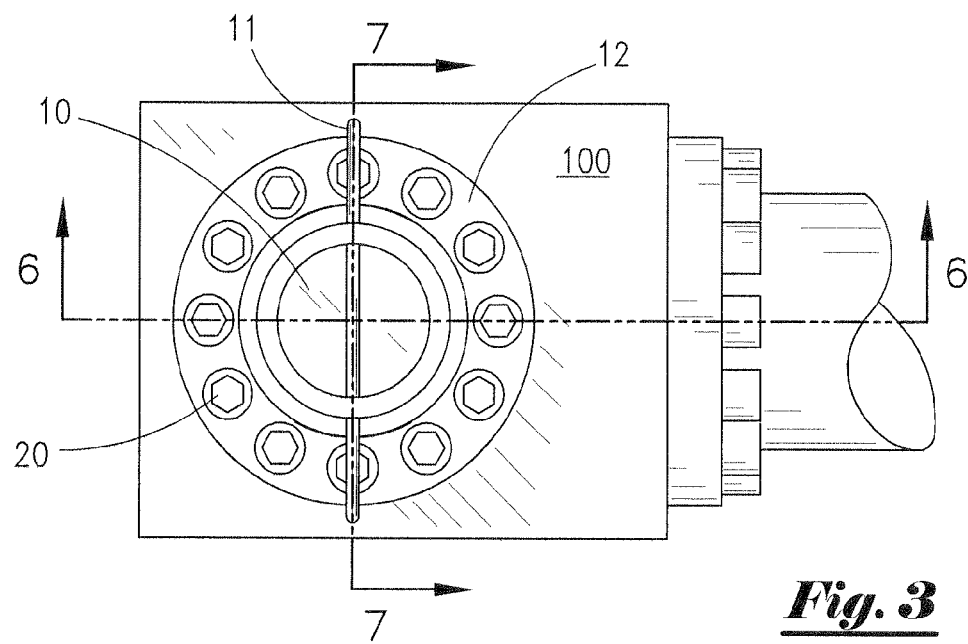
FIG. 3 is a top view of the assembly shown in FIG. 2.
Figure 4:
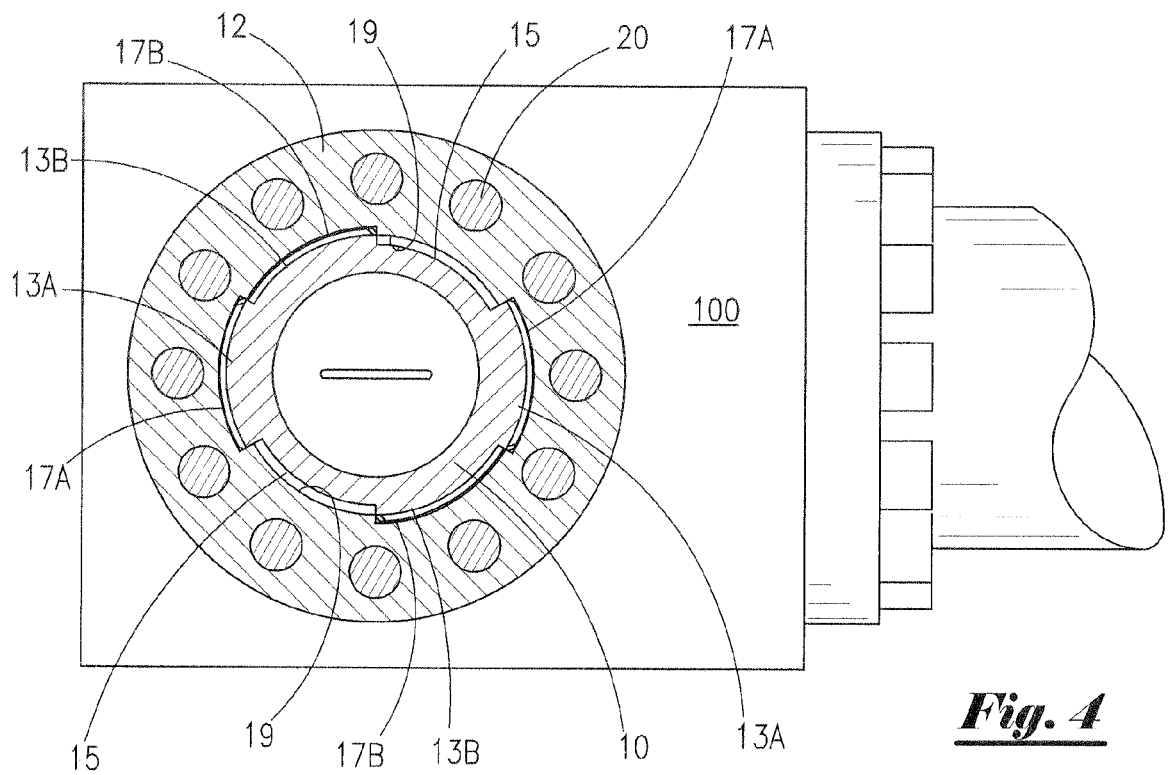
FIG. 4 is a top cross-sectional view of the assembly of FIG. 2 prior to turning the plug retainer onto the receiving flange to mate their corresponding thread segments.
Figure 5:
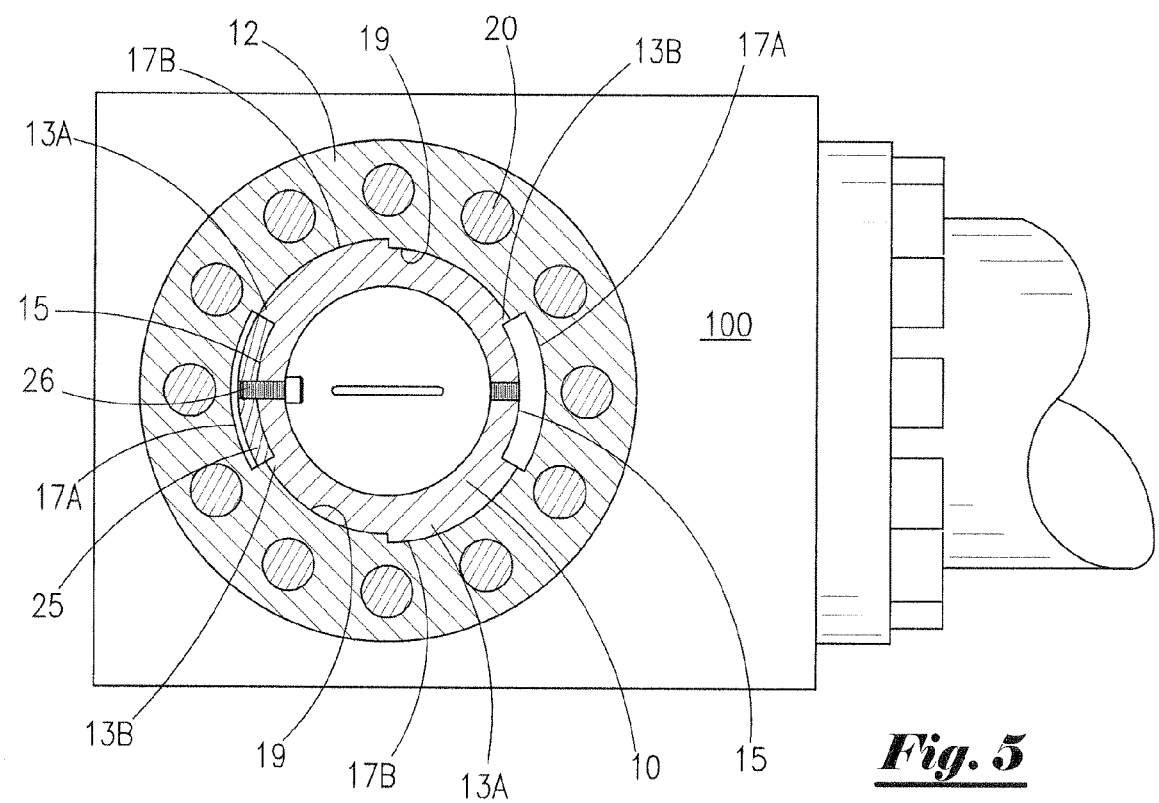
FIG. 5 is a top cross-sectional view of the assembly of FIG. 2 after the plug retainer is turned onto the receiving flange to mate their corresponding thread segments.

FIG. 1 is an exploded view of a plug retainer 10, a receiving flange 12, a seal plug 110, and a module pot plug seal 120 of the present invention for assembly with the valve guide bushing components 140 on the fluid module 100 of a mud pump.

The plug retainer 10 has on its periphery at least two lines of axially disposed thread segments 14, each line of thread segments 14 having a plurality of threads 13. The lines of thread segments 14 are spaced apart from each other a desired amount to form gaps 15 between the thread segments 14.

Similarly, the receiving flange 12 has bore 18 to correspond with the plug retainer 10. Along the bore 18 of the receiving flange 12 are at least two lines of axially disposed thread segments 16, each line of thread segments 16 having a plurality of threads 17. The lines of thread segments 16 are spaced apart from each other a desired amount to form gaps 19 between the lines of thread segments 16.

Each line of thread segments 14 on the plug retainer 10 is comprised of at least two columns of threads 13, each column of threads 13 extending outwardly from the plug retainer 10 in a stepped fashion. Each line of thread segments 16 on the receiving flange 12 is comprised of at least two columns of threads 17, each of the columns extending inwardly from the edge of the bore 18 of the receiving flange 12 in a stepped fashion in a manner opposite of the steps of the columns of threads 13 on the plug retainer 10. The lines of thread segments 16 of the receiving flange 12 are configured to correspond and mate with the lines of thread segments 14 on the plug retainer 10.

As shown in FIGS. 1 through 7, the receiving flange 12 is mounted onto fluid module 100 by means of mounting bolts 20 through bolt holes 22 in the receiving flange 12. The plug retainer 10 is axially inserted into the bore 18 of the receiving flange 12 by fitting the outermost extending column of threads 13 of thread segments 14 of the plug retainer 10 through the gaps 19 of the receiving flange 12.

Once the plug retainer 10 is fitted into the bore 18 of the receiving flange 12, the plug retainer 10 may be rotated within the receiving flange 12 by the handle bars 11 so that the thread segments 14 of the plug retainer 10 are turned to engage and mate with the thread segments 16 of the receiving flange 12 to retain the plug retainer 10 in the receiving flange 12. At least one plug retainer lock plate 25 is provided on the plug retainer 10 to drop into the blank gap to prevent unwanted rotation of the plug retainer 10 once the plug retainer 10 is fitted in place on the receiving flange 12.

Other means could be provided to rotate the plug retainer 10 in the receiving flange 12. As an example, the plug retainer 10 could be configured with flats to support a wrench face, configured to have sockets for receiving a socket wrench, or configured to have a bore for receiving a removable turning rod.

FIGS. 8 through 12 show an embodiment of the plug retainer 10. The plug retainer 10 has two lines of thread segments 14 that are circumferentially positioned and axially disposed along the length of the plug retainer 10 to create gaps 15 between the thread segments 14 on the plug retainer 10. The thread segments 14 have threads 13 that are horizontally disposed on the plug retainer 10 and are not inclined. These horizontally disposed threads 13 create horizontal rows of threads 13 with spaces between each of the rows.

Figure 11:
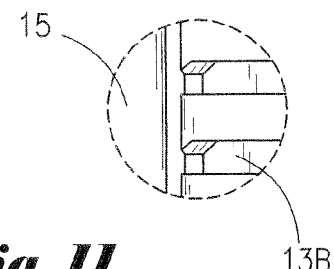
FIG. 11 is a partial side view of the plug retainer of a thread segment of the plug retainer plug showing the square cross-section and tapered ends of the threads.
Figure 10:
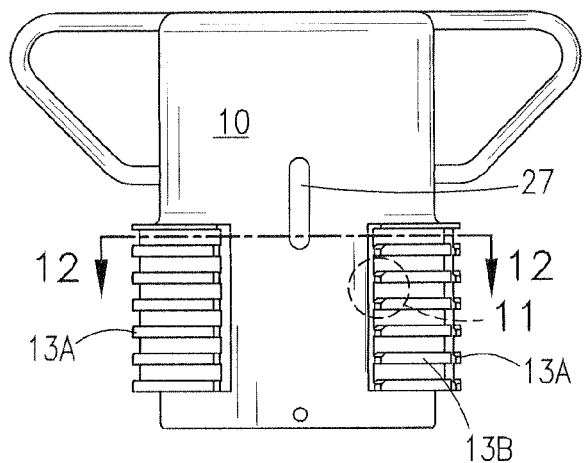
FIG. 10 is a side view of the plug retainer of FIG. 8 showing the gap segment between the thread segments.
Figure 9:
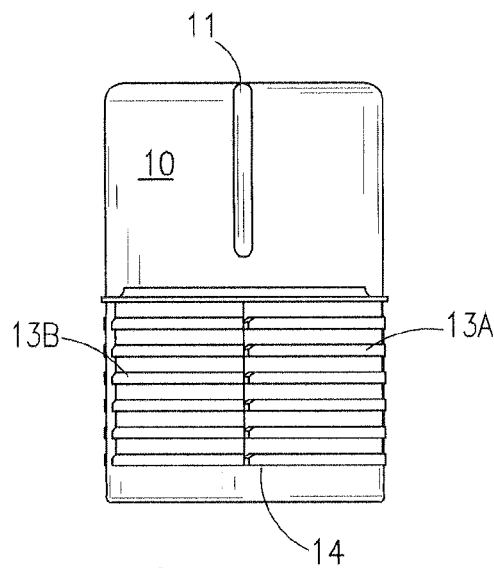
FIG. 9 is a side view of the plug retainer of FIG. 8 showing the thread segments.

Each of the threads 13 of the axially disposed thread segments 14 have a substantially square cross-sectional area with all sharp edges removed and, as shown in FIG. 11, have a tapered or chamfered end configuration 21. The non-inclined threads 13 with the tapered end configuration 21 are less expensive to machine and will aid in protecting the sealing area from corrosion and abrasion. Inclined threads, which could use a plug seal that is energized by compression, could also be used for the threads of the plug retainer 10.

The threads 13 of each line of thread segments 14 are divided into at least two adjoining stepped columns, each stepped column of threads 13 in the line of thread segments 14 having a different radius from the other so that the columns of threads 13 forming thread segments 14 create a series of steps of decreasing radius along the arc length of the thread segment 14 as the stepped columns of threads 13 progress clockwise around the plug retainer 10 from each gap 15.

The gap 15 between the thread segments 14 has the smallest radius, which extends from the center of the plug retainer 10 to its outer wall and the largest arc length. The stepped columns of threads 13 begin at the edge of one gap 15 and progress clockwise in steps outward from the outer wall of the plug retainer 10. The first stepped column of threads 13 has the largest radius from the center of the plug retainer 10 to the outer edge of the threads 13 in that column and next largest arc length. The next stepped columns of threads 13 has the next largest radius from the center of the plug retainer 10 to the outer edge of the threads 13 in that column and next largest arc length. The stepped columns of threads 13 progress around the plug retainer 10 in that fashion until the next gap 15. There the column of threads 13 have their smallest radius from the center of the plug retainer 10 and have their smallest arc length. The sequence begins again at the end of the next gap 15. For increased strength, the combined arc lengths of the gaps 15 between thread segments 14 are less than half of the total arc length of the gaps 15 and thread segments 14 into which the plug retainer 10 is divided.

Figure 12:
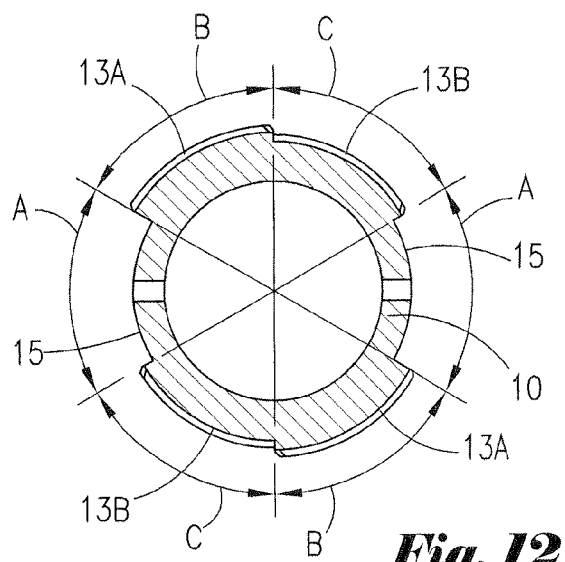
FIG. 12 is a top cross-section view of the plug retainer of the present invention showing the spacing of the thread segments of the plug retainer.
Figure 13:
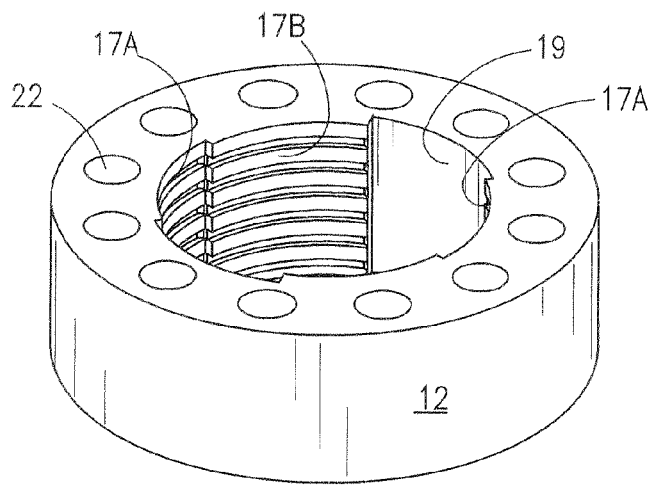
FIG. 13 is a perspective view of the receiving flange of the present invention.

In the embodiment shown in FIGS. 8 through 12, the plug retainer 10 has two thread segments 14, each divided into two stepped columns of linear threads 13, which are separated by gaps 15. As shown in FIG. 12, a top cross-section view of the plug retainer 10 cut to show the spacing of thread segments 14 and gaps 15, the gaps 15 are disposed upon a circular arc A of approximately 62 degrees. The thread segments 14 are disposed opposite each other on the plug 10 and are configured in two thread columns, 13A and 13B. The first column 13A of threads 13 is disposed on a circular arc B of approximately 60 degrees and the second column 13B of threads 13 disposed on a circular arc C of approximately 58 degrees.

The threads 13 of the first column 13A have a thread radius from the center of the plug 10 greater than the thread radius of the threads 13 adjoining second column 13B of threads 13 in that thread segment 14. This creates stepped columns of threads 13, each column having a progressively smaller thread radius than the other as the steps proceed clockwise from a gap 15. It can be seen that a plurality of thread columns of threads 13 can be provided in each line of thread segments 14 to form a plurality of progressively stepped thread segments.

FIGS. 13 through 16 show the details of receiving flange 12 that corresponds with the retainer plug 10. The receiving flange 12 has thread segments 16 that are axially disposed along the length its bore 18. In the embodiment depicted, the threads 17 of each thread segment 14 are horizontally disposed, not inclined, and have a square cross-sectional area and a tapered end configuration so as to correspond to and mate with the threads 13 of the plug retainer 10. In a manner similar to the thread segments 14 of the plug retainer 10, lines of thread segments 16 are circumferentially positioned along the bore 18 of the receiving flange 12, each having a plurality of threads 17, and spaced apart to form a gap 19 between the lines of thread segments 16.

As with the threads 13 of each line of thread segments 14 in the plug retainer 10, the threads 17 of each line of thread segments 16 in the bore 18 of the receiving flange 12 are divided into at least two adjoining stepped columns progressing clockwise around the bore 18 of the receiving flange 12. Each stepped column of threads 17 in the line of thread segments 16 has a progressively smaller radius from the center of the receiving flange 12 than the other so that each of the thread segments 16 is comprised of a series of steps of decreasing radius and decreasing arc length around the bore 18 of the receiving flange 12. It is thought that the thread segments 16 and the gaps 19, respectively, will have the same arc angles as those of the thread segments 14 and gaps 15 of the plug retainer 10.

In the embodiment shown in FIGS. 13 through 16 the receiving flange 12 has two thread segments 16, each divided into first and second stepped columns 17A and 17B, respectively, of linear threads 17 which are separated by gaps 19. The stepped columns 17A and 17B decrease in radius and decrease in arc length as they proceed from each gap 19 clockwise around the bore 18 of the receiving flange 12.

Figure 14:
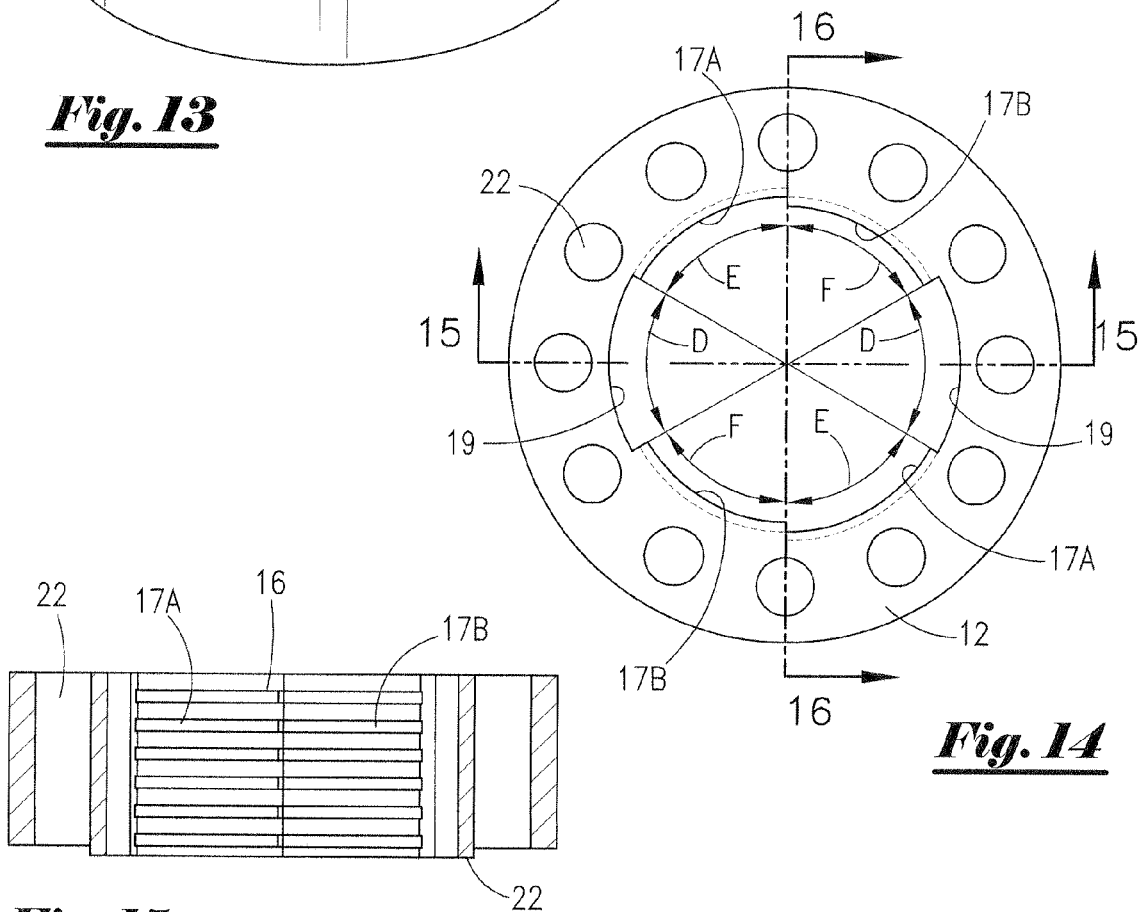
FIG. 14 is a top view of the plug retainer of the present invention showing the spacing of the thread segments of the receiving flange.
Figure 15:
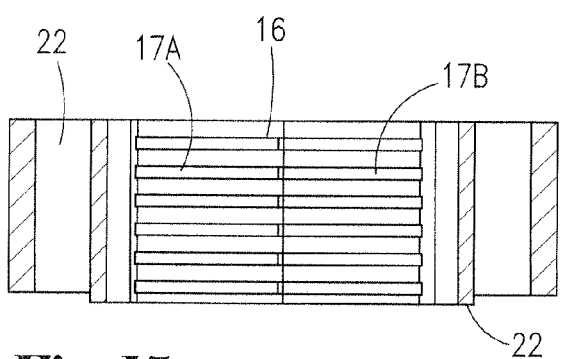
FIG. 15 is a side cross-sectional view of the receiving flange of the present invention shown in FIG. 13 showing the thread segments.
Figure 16:
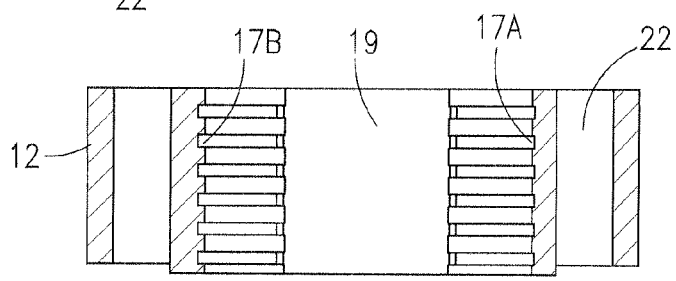
FIG. 16 is a side cross-sectional view of the receiving flange of the present invention shown in FIG. 13 showing the gap segments.

As shown in FIG. 14, the gaps 19 are disposed in the bore 18 of the receiving flange 12 upon a circular arc D having and arc angle of approximately 62 degrees angle so as to correspond with the gap 15 in the receiving plug 10. Similarly, the thread segments 16 are disposed opposite each around the bore 18 of the receiving flange 12.

The first column 17A of threads 17 in each line of thread segments 16 of the receiving flange 12 has a thread radius from the center of the receiving flange 12 less than the thread radius of the adjoining second column 17B of threads 17 in that thread segment 16 so as to form stepped columns of threads 17 progressing clockwise from each gap 19 around the bore 18 of the receiving flange 12 so that each column of threads 17 will have a progressively smaller thread radius from the center of the receiving flange 12 than its preceding column. As with the threads 13 of each line of thread segments 14 in the plug retainer 10, it can be seen that a plurality of columns of threads 17 can be provided in each line of thread segments 16 to form progressively stepped thread segments.

Figure 20:
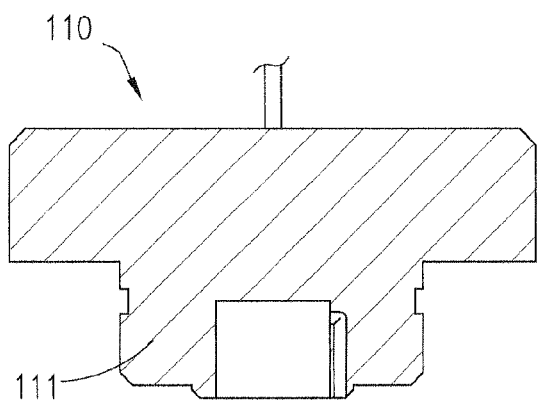
FIG. 20 is a partial cross-section view of the seal plug shown in FIG. 19.
Figure 19:
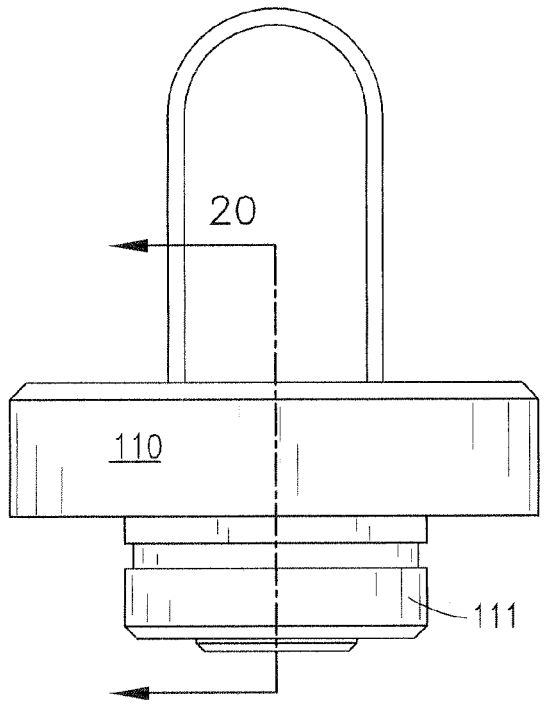
FIG. 19 is a side view of the seal plug of the present invention.
Figure 21:
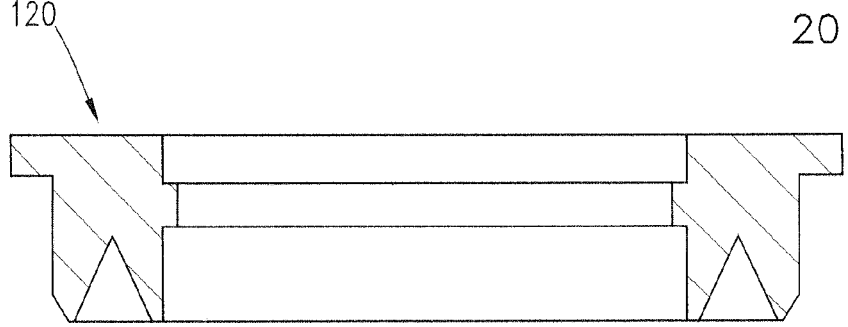
FIG. 21 is a cross-section view of the module pot plug seal.

The seal plug 110 of the present invention is shown in FIGS. 19 and 20. The seal plug 110 has an elongated shaft 111. The shaft 111 is shaped to be inserted into and hold in place the resilient, flexible ring or doughnut shaped module pot plug seal 120 shown in a cross-section view in FIG. 21. The resilient plug seal 120 and seal plug shaft 111 have corresponding grooves and riser rings to mechanically and frictionally hold the plug seal 120 on the seal plug shaft 111. This combination of seal plug 110 and plug seal 120 will serve to form a pressurized seal of the module pot 130 of the fluid module 100 of a mud pump.

In the embodiment of the receiving flange 12 shown in FIGS. 13 through 16, the first column of threads 17A is disposed on a circular arc E of approximately 60 degrees and the second column of threads 17B is disposed on a circular arc F of approximately 58 degrees so as to correspond with the arc angles B and C of the thread columns 13A and 13B, respectively, of the thread segments 14 on the plug retainer 10.

To effectuate the placement of the module pot plug seal 120 on the fluid module 100 of a mud pump, receiving flange 12 is bolted onto the flanged opening or module pot 130 of the fluid module 100 of a mud pump by means bolts 20. The seal plug 110 is fitted with plug seal 120 and is placed into the module pot 130 of the fluid module 100. The plug retainer 10 is then axially inserted into the receiving flange 12 so that column 13A of each thread segment 14 of the plug retainer 10 is axially inserted through the gaps 19 of the receiving flange 12. Doing so axially moves the columns 13B of each thread segment 14 of the plug retainer 10 through the columns 17A of thread segments 16 of the receiving flange 12 (gaps 19 and columns 17A having a larger thread radius and arc length, respectively, than the thread radius and arc length of columns 13A and 13B of the plug retainer 10).

After the plug retainer 10 is axially inserted into the receiving flange 12, as recited above, the plug retainer 10 is rotated clockwise to engage column 13A of threads 13 on the plug retainer 10 with column 17A of threads 17 of receiving flange 12. Doing so will engage column 13B of threads 13 on the plug retainer 10 with column 17B of threads 17 of receiving flange 12.

When thread arc angles A, B, and C on the plug retainer 10 and thread arc angles D, E, and F on the receiving flange 12 are configured to directly correspond to each other in a 62 degree-60 degree-58 degree sequence, respectfully, only about a about one-sixth of a turn clockwise of the plug retainer 10, by means of handle bars 11 or otherwise, will engage the plug retainer 10 with the receiving flange 12. Conversely, in the embodiment of the invention shown, the plug retainer 10 can be removed from the receiving flange 12 by rotating the plug retainer 10 approximately one-sixth of a turn counter-clockwise and axially extracting it from the receiving flange 12. The respective positions of the segments of the plug retainer and receiving flange could be reversed so that the plug retainer could be engaged by rotating it counter-clockwise and disengaged by rotating it clockwise.

Figure 6:
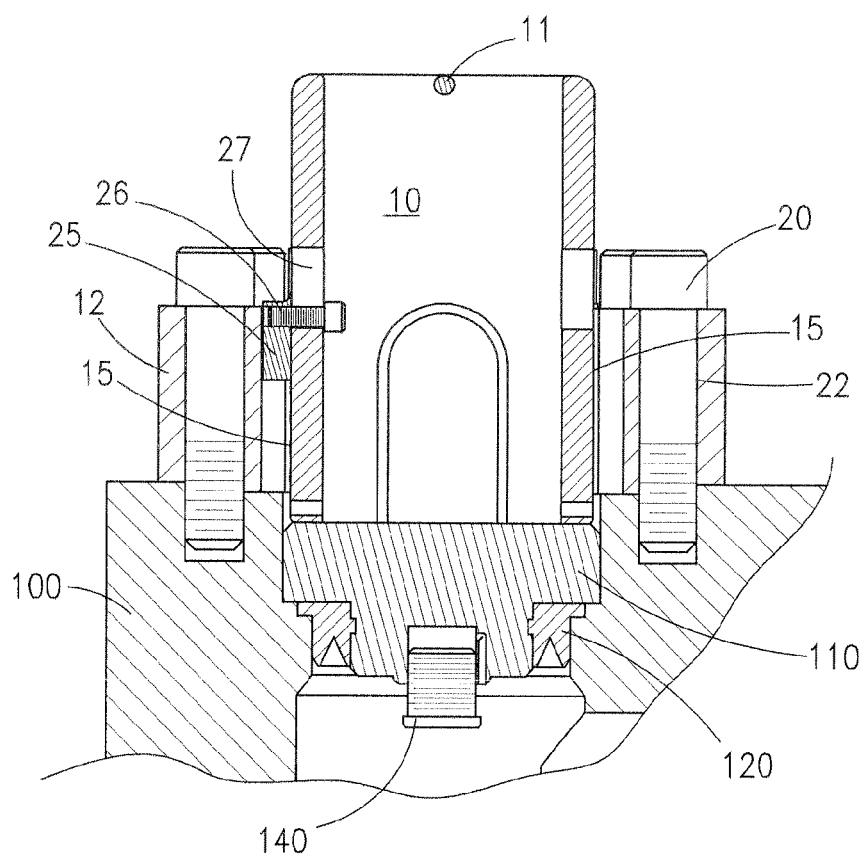
FIG. 6 is a partial cross-sectional view of FIG. 3 prior to turning the plug retainer onto the receiving flange to mate their corresponding thread segments.
Figure 7:
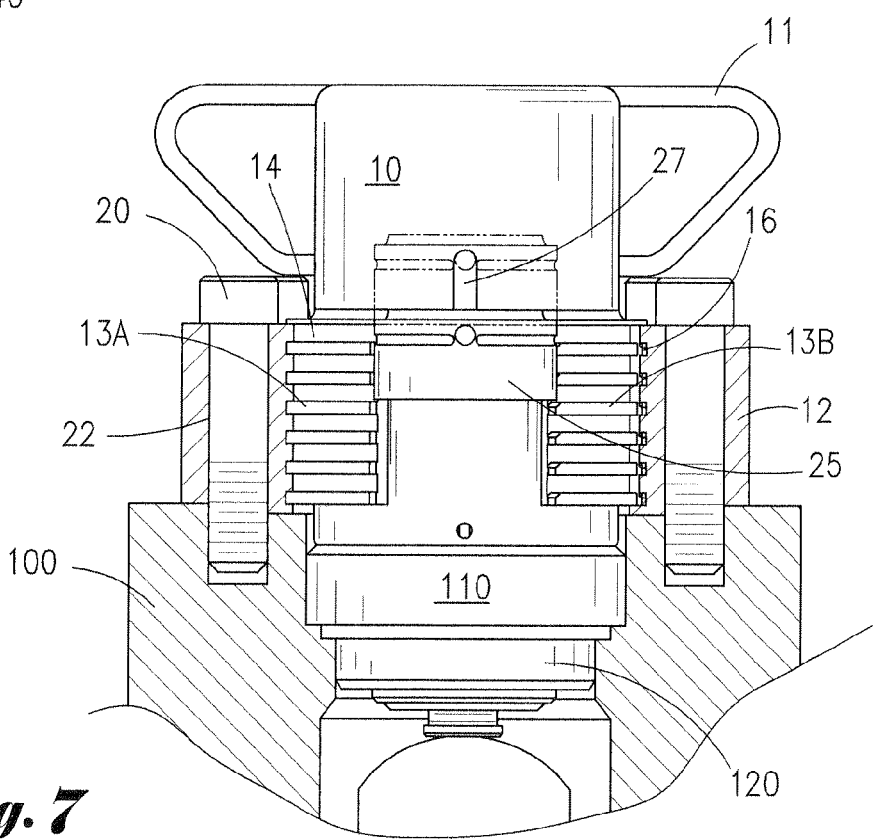
FIG. 7 a partial cross-sectional view of FIG. 3 after the plug retainer is turned onto the receiving flange to mate their corresponding thread segments.
Figure 8:
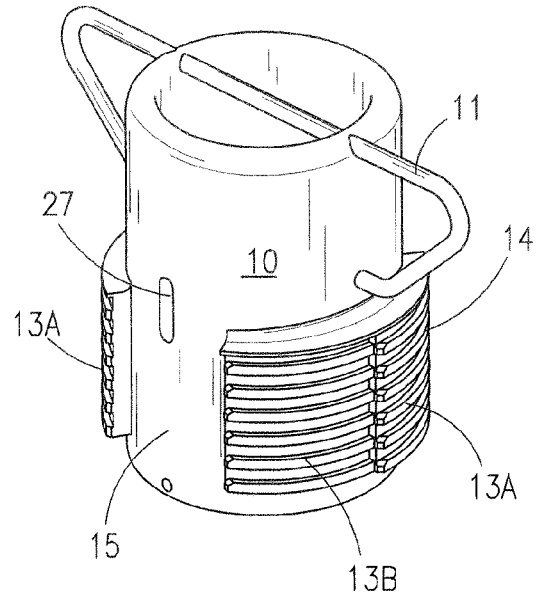
FIG. 8 is a perspective view of the plug retainer of the present invention.
Figure 17:
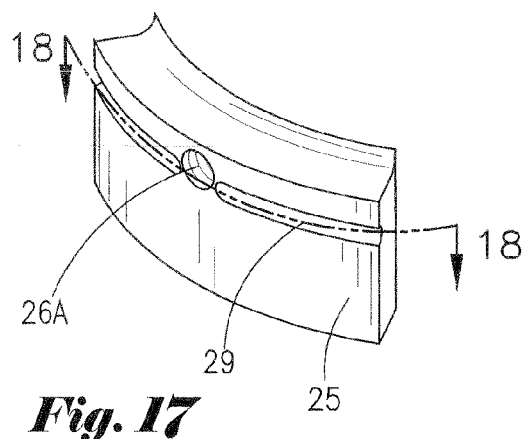
FIG. 17 is a perspective view of the plug retainer lock plate.
Figure 18:
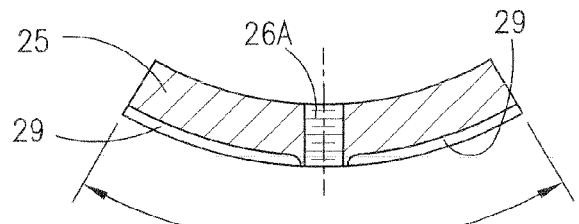
FIG. 18 is a top cross-sectional view of the plug retainer lock plate of FIG. 17.

The plug retainer lock plate 25, as shown in FIG. 1 and again in FIGS. 6 and 7, is depicted in FIGS. 17 and 18. The lock plate 25 has a bore 26A that is fitted to retain a cap screw 26. The lock plate 25 slides axially along the gap 15 of the plug retainer 10 by means of the lock plate cap screw 26 which is positioned in an axially oriented slot 27 that corresponds with gap 15 in the plug retainer 10. This slot 27 defines a raised and lowered position for the lock plate 25. The position of the cap screw 26 and the length of the slot 27 are such that when the lock plate 25 is in a raised position as the plug retainer 10 is inserted in the bore 18 of the receiving flange 12, the lock plate 15 will slide along the top of the thread segments 16 of the receiving flange 12.

When the lock plate 25 reaches the gap 19 between the thread segments 16 as the plug retainer 10 is turned in the receiving flange 12, the lock plate 25 will drop down slot 27 to its lowered position on the plug retainer 10. When dropped to the lowered position, the lock plate 25 will fit into gap 19 between the thread segments 16 of the receiving flange 12 and prevent the plug retainer 10 from rotating in the receiving flange 12. This will further serve to secure the plug retainer 10 in place to effectuate the seal on the fluid module 100. The lock plate 25 is lifted to its raised position to allow the plug retainer 10 to be rotated for its removal from the receiving flange 12. The lock plate 25 may be provided with grooves 29 to assist in withdrawing the lock plate 25 from the gap 19 to its raised position to allow the plug retainer 10 to be rotated for its removal from the receiving flange 12.

The plug retainer and receiving flange and method of the present invention and many of the attendant advantages of the invention will be understood from the foregoing description. Various changes could be made to the form, construction and the arrangement of the parts of the present invention without departing from the spirit and scope of the invention or sacrificing any material advantages. The form of the plug retainer and receiving flange described herein is merely an exemplary embodiment of the invention.

I claim:

1. A plug retainer and receiving flange for a mud pump fluid module pipe comprising:
   a) a plug retainer;
   b) a receiving flange, said receiving flange having a bore for receiving said plug retainer;
   c) a least two segments of plug retainer threads axially disposed upon and extending from the periphery of said plug retainer, each segment of plug retainer threads having at least a first and a second column of threads, said segments of plug retainer threads being disposed opposite each other on said plug retainer to form gaps between each of said segments of plug retainer threads, said first and said second columns of threads on said segments of plug retainer threads being progressively stepped outward from said the periphery of said plug retainer;
   d) at least two segments of receiving flange threads axially disposed upon the periphery of said receiving flange bore, said segments of receiving flange threads being disposed opposite each other along said receiving flange bore to form gaps between each of said segments of receiving flange threads, each said segment of receiving flange threads having at least a first and a second column of threads, said receiving flange threads being progressively stepped inward from said bore of said receiving flange, said first and second columns of receiving flange thread segments being configured to correspond with said first and second columns of said plug retainer thread segments; and e) a means to rotate said plug retainer within said bore of said receiving flange to engage said segments of plug retainer threads with said segments of receiving flange threads.

2. The apparatus according to claim 1, wherein said plug retainer threads and said receiving flange threads are horizontally disposed.

3. The apparatus according to claim 2 wherein said plug retainer threads and said receiving flange threads have a square cross-sectional area and chamfered ends.

4. The apparatus according to claim 1 wherein said means to rotate said plug retainer is a handle mounted to said plug retainer.

5. The apparatus according to claim 1 wherein a said gap, said first column of threads on each said segment of plug retainer threads and said second column of threads on each said segment of plug retainer threads are disposed on said periphery of said plug retainer in progressively smaller arc angles.

6. The apparatus according to claim 5 wherein a said gap, said first column of threads on each said segment of receiving flange threads and said second column of threads on each said segment of receiving flange threads are disposed to correspond, respectively, with said arc angles of said gap and said first and said second columns of threads on said thread segments of said plug retainer.

7. The apparatus according to claim 6 wherein a said gap between said thread segments of said plug retainer has an arc angle of about 62 degrees.

8. The apparatus according to claim 7 wherein said first column of threads on each said segment of receiving flange threads is disposed upon about a 60 degree arc angle and said second column of threads on each said segment of receiving flange threads is disposed upon about a 58 degree arc angle.

9. The apparatus according to claim 6 wherein said first and said second columns of threads on said segments of plug retainer threads are progressively stepped outward from said the periphery of said plug retainer with said first column of threads on each said segment having a larger thread radius than the thread radius of said second column of threads on each said segment of plug retainer threads.

10. The apparatus according to claim 7 wherein said first and said second columns of threads on said segments of receiving flange threads are progressively stepped inward from said the periphery of said bore of said receiving flange with said first column of threads on each said segment of receiving flange threads having a smaller thread radius than the thread radius of said second column of threads on each said segment of receiving flange threads.

11. The apparatus according to claim 8, wherein
a) said first and said second columns of threads on said segments of plug retainer threads are progressively stepped clockwise from the edge of said gaps between said segments of plug retainer threads; and
b) said first and said second columns of threads on said segments of receiving flange threads are progressively stepped clockwise from the edge of said gaps between said segments of receiving flange threads.

12. The apparatus according to claim 9 wherein a said gap between said thread segments of said plug retainer has an arc angle of about 62 degrees.

13. The apparatus according to claim 10 wherein said first column of threads on each said segment of receiving flange threads is disposed upon about a 60 degree arc angle and said second column of threads on each said segment of receiving flange threads is disposed upon about a 58 degree arc angle.

14. The apparatus according to claim 11, wherein said plug retainer threads and said receiving flange threads are disposed at an angle.

15. The apparatus according to claim 11, wherein:
a) said plug retainer threads and said receiving flange threads are horizontally disposed with a square cross-sectional area and chamfered ends.

16. The apparatus according to claim 6, wherein:
a) said plug retainer has an axially oriented slot aligned with at least one of said gaps between said plug retainer threads; and
b) said plug retainer having a plate slidably retained on said plug retainer on said axially oriented slot, whereby said plate may move axially along said gap between said plug retainer threads.

17. The apparatus according to claim 14 wherein said plug retainer threads and said receiving flange threads are horizontally disposed.

18. The apparatus according to claim 15, further comprising:
a) a doughnut shaped resilient plug seal; and
b) a plug seal retainer having an elongated shaft, said elongated shaft being configured to retain said resilient plug seal.

19. The apparatus according to claim 16 wherein a said gap between said thread segments of said plug retainer has an arc angle of about 62 degrees and wherein said first column of threads on each said segment of receiving flange threads is disposed upon about a 60 degree arc angle and said second column of threads on each said segment of receiving flange threads is disposed upon about a 58 degree arc angle.

* * * * *